United States Patent [19]

Morita et al.

[11] Patent Number: 5,332,296

[45] Date of Patent: Jul. 26, 1994

[54] APPARATUS AND METHOD FOR CONTROLLING REAR WHEEL BRAKING FORCE OF VEHICLE

[75] Inventors: Takao Morita, Toyota; Tsutomu Matsukawa, Okazaki; Hiromichi Yasunaga, Okazaki; Tadao Tanaka, Okazaki; Akihiko Togashi, Okazaki; Yasutaka Taniguchi, Hoi; Masanori Tani, Okazaki, all of Japan

[73] Assignee: Mitsubishi Jidosha Kogyo Kabushiki Kaisha, Tokyo, Japan

[21] Appl. No.: 983,363

[22] Filed: Nov. 30, 1992

[30] Foreign Application Priority Data

Nov. 29, 1991 [JP] Japan ................... 3-315655

[51] Int. Cl.$^5$ .............................................. B60T 15/00
[52] U.S. Cl. .................................... 303/9.62; 303/111
[58] Field of Search ............... 303/9.62, 9.71, 9.73, 303/100, 103, 111, 113.1, 113.5; 364/426.02

[56] References Cited

U.S. PATENT DOCUMENTS

| | | | |
|---|---|---|---|
| 4,659,150 | 4/1987 | Kubota et al. | 303/9.62 |
| 4,902,076 | 2/1990 | Ushijima et al. | 303/100 |
| 4,943,123 | 7/1990 | Takeda et al. | 303/9.62 X |
| 4,982,999 | 1/1991 | Rossigno et al. | 303/113.5 X |
| 5,172,961 | 12/1992 | Inoue et al. | 303/9.62 |
| 5,224,765 | 7/1993 | Matsuda | 303/9.62 |
| 5,228,757 | 7/1993 | Ito et al. | 303/9.62 X |

FOREIGN PATENT DOCUMENTS

| | | |
|---|---|---|
| 0210335 | 4/1986 | European Pat. Off. . |
| 0330149 | 2/1989 | European Pat. Off. . |
| 0392815 | 10/1990 | European Pat. Off. . |
| 0482374 | 4/1992 | European Pat. Off. . |
| 3440541 | 5/1985 | Fed. Rep. of Germany . |
| 3527455 | 2/1986 | Fed. Rep. of Germany . |
| 3702682 | 6/1988 | Fed. Rep. of Germany . |
| 4141877 | 6/1992 | Fed. Rep. of Germany . |

*Primary Examiner*—Robert J. Oberleitner
*Assistant Examiner*—Lee W. Young
*Attorney, Agent, or Firm*—Abelman Frayne & Schwab

[57] ABSTRACT

A rear wheel braking force control apparatus of a vehicle includes a pressure sensor 74 for detecting master cylinder pressure, right and left proportioning valves $57_1$ and $57_2$ individually disposed in passages for transmitting master cylinder pressure to right and left wheel cylinders of the rear wheels for controlling to decrease changes in wheel cylinder pressure relative to changes in master cylinder pressure, right and left PCV bypass valves 62 and 63 for individually bypassing the proportioning valves, and a controller 71 which, when the vehicle is determined by a steering angle sensor 77 or the like to be turning, closes the PCV bypass valve at the outer wheel side when the master cylinder pressure is higher than the pressure of the PCV bypass valve at the inner wheel side.

20 Claims, 18 Drawing Sheets

APPARATUS AND METHOD FOR CONTROLLING REAR WHEEL BRAKING FORCE OF VEHICLE

BACKGROUND OF THE INVENTION

This invention relates to an apparatus and a method for controlling rear wheel braking force of a vehicle to control allocation of front wheel braking force and rear wheel braking force.

When a brake pedal is pressed down, a braking hydraulic pressure (hereinafter called a "master cylinder pressure") generated in a master cylinder is transmitted to wheel cylinders of four wheel to generate braking forces on the individual wheel.

Since, when the amount of pressing down the brake pedal is increased, the braking forces generated on the individual wheels are increased, deceleration of the vehicle increases. When the deceleration of the vehicle increases, a rear wheel load decreased, resulting in a decrease in surface gripping of rear wheels. In such a braking condition that braking (high-G braking) is generated to increase the deceleration of the vehicle, there is a problem in that, when the master cylinder pressure is distributed and transmitted almost equally to the front and wheel cylinders, the rear wheels tend to lock earlier resulting in deteriorated braking stability of the vehicle.

Therefore, a proportioning valve (PCV) has been incorporated in a brake system, which functions to transmit the master cylinder pressure, as is, to the wheel cylinder of the rear wheels when the braking force is small, and reduce increasing rate of hydraulic pressure transmitted to the wheel cylinder of the rear wheels when the master cylinder pressure exceeds a preset value, thereby preventing early locking of the rear wheels.

A prior art braking system will be described with reference to FIGS. 15 to 19. FIG. 15 is a schematic view showing structure of a prior art braking system, FIG. 16 is a schematic view showing hydraulic pressure allocation of the prior art braking system, FIG. 17 and FIG. 18 are schematic sectional views showing condition of a proportioning valve, and FIG. 19 is a schematic view explaining operation of the proportioning valve.

FIG. 15 shows a X-piping braking system commonly used in FF type vehicles, in which numeral 11 indicates a brake pedal. Pressing-down force of the brake pedal 11 is amplified in an assister unit 12 and transmitted to a tandem master cylinder 13.

The master cylinder 13 is provided with two hydraulic pressure generators (not shown) to generate a braking hydraulic pressure according to the amount of pressing down the brake pedal 11. One of the hydraulic pressure generators is connected to a wheel cylinder $15_1$ for a left front wheel through a pipe 14, and also to a wheel cylinder $15_4$ of a right rear wheel through a pipe 16 branched halfway from the pipe 14 and a PCV $17_2$.

The other hydraulic pressure generator is connected to a wheel cylinder $15_2$ of a right front wheel through a pipe 18, and also to a wheel cylinder $15_3$ of a left rear wheel through a pipe 19 branched halfway from the pipe 18 and a PCV $17_1$.

PCVs $17_1$ and $17_2$ are proportioning valves, which transmit a hydraulic pressure generated by the master cylinder 13, as is, up to a preset value, but when the preset value is exceeded, reduce hydraulic pressure increasing rate to the rear wheels to provide a bent-curved relation in the rear wheel braking force relative to the braking force of the front wheels. This value itself is of a conventional type known in the art, however, its structure to provide the bent-curved relation in hydraulic characteristics will be described with reference to FIGS. 17 to 19.

In FIG. 17, numeral 31 indicates a valve housing. A cylindrical valve chamber 32, with its inner peripheral surface stepwise formed, is formed in the housing 31. The valve chamber 32 comprises a large-diameter cylinder chamber 33 and a small-diameter cylinder chamber 34. A cylindrical valve body 35, movable in the axial direction, is disposed in the cylinder chamber 33, the diameter of the valve body 35 being slightly greater than the diameter of the cylinder chamber 34. A hole h for communicating hydraulic oil is provided from the peripheral surface of the valve body 35 towards the central axis, or from the central axis to the side surface.

Furthermore, a plunger 36 provided in the valve body 35 is slidably inserted into a guide hole 37 provided in the housing 31.

An output port 36 for outputting hydraulic pressure to the wheel cylinder is formed on one side of the cylinder chamber 33, and an input port 39 for inputting hydraulic pressure from the master cylinder 13 is formed on a peripheral surface of the cylinder chamber 34.

A spring 40 is disposed in the cylinder chamber 34, one end of the spring 40 contacts against one side surface of the valve body 35, the valve body 35 is normally pressed towards the output port 38 side by an urging force of the spring 40, and a gap A is formed between the periphery of the valve body 35 and the end portion of the cylinder chamber 34, forming a valve-open condition. That is, an input hydraulic pressure Pi is transmitted as an output hydraulic pressure Po through the gap A and the hole h.

Where So is a pressure-receiving area of the valve body 35 output port side, Si is a pressure-receiving area of the cylinder chamber 34 side, F is an urging force of the spring 40, and Po is an output hydraulic pressure, the valve body 35 is moved to the right or left according to which is greater, "Pi·Si" or "Po·So".

As described above, since the gap A is opened by the urging force of the spring 40 in the initial state, the input hydraulic pressure Pi is outputted, as is, as an output hydraulic pressure Po. That is, the output hydraulic pressure increases according to the amount of pressing down the brake pedal 11.

When the output hydraulic pressure Po increases, the value "Po·So" increases, resulting in Po·So > Pi·Pi + F past a setting pressure P1. As a result, the valve body 35 moves towards the cylinder chamber 34 against the urging force of the spring 40, and the gap A is closed by a peripheral edge portion of the valve body 35 as shown in FIG. 18, maintaining the output hydraulic pressure Po. From this condition, when the brake pedal 11 is pressed down even further to increase the input hydraulic pressure Pi resulting in Po·So < Pi·Pi + F, the gap A is opened again as shown in FIG. 17, and the output hydraulic pressure Po increases according to the increase in the input hydraulic pressure Pi. As a result, the gap A is closed by the increase in the output hydraulic pressure Po as described above, thereby maintaining the output hydraulic pressure Po. Thus, as shown in FIG. 19, past the setting pressure P1, the output hydraulic pressure Po varies so that the gradient of the output hydraulic pressure Po against the input hydraulic pressure Pi is reduced, and the output hydraulic pressure Po gradually increases past the setting pressure P1.

Magnitude of the setting pressure P1 and the gradient of the output hydraulic pressure Po against the input hydraulic pressure Pi past the setting pressure P1 are determined solely by mechanical constants such as the urging force F of the spring 40, pressure-receiving areas Si and So and the like.

Relationship between a preset braking force allocation and an ideal braking force allocation of the vehicle set by the mechanical factors of $PCV17_1$ and $17_2$ will now be described with reference to FIG. 16. In FIG. 14, A indicates a preset braking force allocation straight line having a bending point showing a preset braking force allocation, and B indicates an ideal braking force allocation curve showing an ideal braking force allocation determined from various parameters of the vehicle.

Here, the ideal braking force allocation means a braking force allocation of front and rear wheels so that a four-wheel simultaneous locking takes place during braking. An intersecting point P11 of the ideal braking force allocation curve B and the dot-bar line of a deceleration of 0.8 G indicates a braking force allocation where the front and rear wheels are simultaneously locked by an abrupt braking with a deceleration of 0.8 G. An intersecting point P12 of the ideal braking force allocation curve B and the dot-bar line of a deceleration of 0.4 G indicates a braking force allocation where the front and rear wheels are simultaneously locked by braking with a deceleration of 0.4 G. Deceleration generated by ordinary braking is 0.2 to 0.3 G.

At points on the straight lines of decelerations of 0.8 G or 0.4 G indicated by dot-bar lines, the total braking forces (sum of the front wheel braking force and the rear wheel braking force) necessary for braking with a deceleration of 0.8 G or 0.4 G are the same.

Furthermore, the two-dot-bar straight lines indicate the braking force of the front or rear wheels for locking the front or rear wheels on a road surface with a friction coefficient $\mu$ of 0.8 or 0.4. Here, frictional coefficient $\mu$ of a dry asphalt road surface of fair weather is approximately 0.8.

Thus, point P11 means an ideal braking force allocation of front and rear wheels for simultaneous locking of the front and rear wheels when an abrupt braking at a deceleration of 0.8 G is made on a road surface with $\mu=0.8$. Point P12 means an ideal braking force allocation of front and rear wheels for simultaneous locking of the front and rear wheels when a braking at a deceleration of 0.4 G is made on a road surface with $\mu=0.4$.

As described above, an ideal braking force allocation curve B for simultaneous locking of front and rear wheels exists, but in practice, it is set so that the braking force of the rear wheels is smaller than the ideal braking force. This is because, if the rear wheels lock earlier than the front wheels, braking stability is deteriorated. That is, the setting braking force is set so that the rear wheel braking force does not exceed the ideal braking force allocation curve B as indicated by straight line A.

When a braking of 0.38 G is made on a road surface with a friction coefficient $\mu=0.4$, braking force allocation is made as indicated by an intersecting point P13 of the straight line of a total braking force of 0.38 G and the setting braking force straight line A, the rear wheels will not lock until the rear wheel braking force allocation at the intersecting point P15.

Furthermore, when a braking of 0.38 G is made on a road surface with a friction coefficient $\mu=0.8$, the rear wheels will not lock even if the rear wheel braking force is increased up to the rear wheel braking force indicated by the braking force allocation as indicated by an intersecting point P14 of the straight line of a total braking force of 0.38 G and the straight line of $\mu=0.8$.

Thus, for braking of the same deceleration, the front wheel braking force can be decreased by Bf according to the road surface condition, and the rear wheel braking force can be increased by Br beyond the ideal braking force allocation.

In other words, as far as the setting braking force straight line A is used, even there is a room in the rear wheel braking force depending on the vehicle traveling and road surface condition, a total braking force is generated by applying a burden to the front wheel braking force to the extent of the room.

In particular, when the vehicle turns, a burden may be applied to the outer front wheel braking force to generate a total braking force even there is a room in the outer rear wheel braking force during a sharp turning. If such an excessive burden is applied to the front wheel braking force, abrasion of the brake pad of the front brake unit may increase and heat evolution increase, resulting in a fade phenomenon where the friction coefficient of the brake pad considerably decreases and a vapor lock due to a temperature increase of brake fluid. Furthermore, this leads to a nose diving at braking, deteriorating the braking stability.

As the prior art based on the similar concept, there have been examples such as Japanese Patent Publication Laid-open 1-257652/1989 (DE3742173, FR2624462, GB2213543), Japanese Patent Publication Laid-open 3-125657 (GB2236156, DE3931858), and Japanese Patent Publication Laid-open 3-208760 (DE4029332, GB2238092, FR2654401).

In these prior art examples, the action of a proportioning valve is invalidated by an electromagnetic valve in the normal condition to increase the braking force allocation to the rear wheels and lighten the burden to the front wheel brake unit, and the electromagnetic valve is operated to effect the action of the proportioning valve only when an antilocking unit malfunctions.

However, these prior art examples do not consider braking force allocation during turning of the vehicle, the proportioning valve is operative only when the antilocking unit malfunctions, and the functions of the proportioning valve cannot be effectively utilized.

With a view to eliminate the above prior art problems, it is a primary object of the present invention to provide a rear wheel braking force control apparatus which, during turning of the vehicle, increases the braking force to the outer rear wheel, which has a room in the braking force, more than the braking force allocation to the inner rear wheel, thereby improving braking stability and braking characteristics during turning of the vehicle.

SUMMARY OF THE INVENTION

In accordance with the present invention which attains the above object, there is provided a rear wheel braking force control apparatus for a vehicle comprising braking degree detection means for detecting degree of braking when the vehicle is braked, turning condition detection means for detecting turning condition of the vehicle, proportioning valves and electromagnetic valves for effecting or invalidating the action of the proportioning valve, provided for individual right and left rear wheels, control means operating the electromagnetic valve to invalidate the action of the proportioning valve when a degree of braking detected by the braking degree detection means is weaker than a predetermined setting degree and effect the action of the proportioning valve when the degree of braking is stronger than the setting degree, and during turning of the vehicle, correcting the setting degree according to a detection output of the turning condition detection means so that the setting degree of the electromagnetic valve of the outer wheel side of turning is relatively higher than the setting degree of the electromagnetic valve of the inner wheel side of turning.

With the apparatus according to the present invention, when the braking degree detected by the braking degree detection means is weaker than the setting degree and there is a room in the rear wheel braking force, the electromagnetic valve is operated to reduce the braking force burden to the front wheels by invalidating the action of the proportioning valve, and when the braking degree becomes stronger than the setting degree and there is no room in the rear wheel braking force, the electromagnetic valve is operated to effect the action of the proportioning valve, thereby preventing early locking of the rear wheels by the function of the proportioning valve.

Furthermore, during turning of the vehicle, since the setting degree is corrected according to the detection output of the turning condition detection means so that the setting degree for the electromagnetic valve of the outer wheel side of turning, where the locking limit increases due to a load transfer during turning, is relatively higher than the setting degree for the electromagnetic valve of the inner wheel side of turning, the action of the proportioning valve of the outer wheel side of turning is delayed relative to the action of the proportioning valve of the inner wheel side of turning, thereby increasing braking force allocation of the outer rear wheel of turning to reduce the braking force burden of the outer wheel side of turning while preventing early locking of the inner rear wheel side of turning.

Thus, with the apparatus according to the present invention, the braking burden of the front wheels can be reduced while effectively utilizing the early locking prevention effect of the rear wheels by the proportioning valve according to the turning condition, thereby achieving improved braking stability during turning.

Furthermore, according to a preferred embodiment of the present apparatus, lateral acceleration detection means for detecting lateral acceleration applied to the vehicle body is provided, the control means increases the setting degree for the electromagnetic valve of the outer wheel side of turning, or reduces the setting degree for the electromagnetic valve of the inner wheel side of turning according to the lateral acceleration, and the delay in action of the proportioning valve of the outer wheel side of turning relative to the action of the proportioning valve of the inner wheel side of turning can be optimized for the turning condition of the vehicle.

As another preferred embodiment of the present invention, the turning condition detection means detects a steering wheel angular velocity of the steering wheel, and when the steering wheel angular velocity is greater than a predetermined value, the control means corrects the setting degree so that the setting degree for the electromagnetic valve of the outer wheel side of turning is relatively higher than that for the inner wheel side of turning, thereby enabling positive control with an improved response.

As another preferred embodiment of the present invention, the control means sets the setting degree to zero for the electromagnetic valve of the inner wheel side of turning to positively function the proportioning valve of the inner wheel side of turning, thereby positively preventing early locking of the inner rear wheel side of turning.

As another preferred embodiment of the present invention, braking condition detection means for detecting the braking condition of the vehicle influencing the height of locking limit of the rear wheels is provided; the control means sets the setting degree according to the braking condition and corrects the setting degree during turning of the vehicle, and the braking force allocation can be effectively increased while positively preventing early locking of the rear wheels during ordinary braking, thereby even further improving the braking effect during turning of the vehicle.

The method according to the present invention can be applied to the apparatus according to the present invention to obtain the same effects as described on the apparatus according to the present invention.

Other features and advantages of the present invention will become apparent from the detailed description given hereinbelow.

DETAILED DESCRIPTION OF THE EMBODIMENTS

Figure 1:
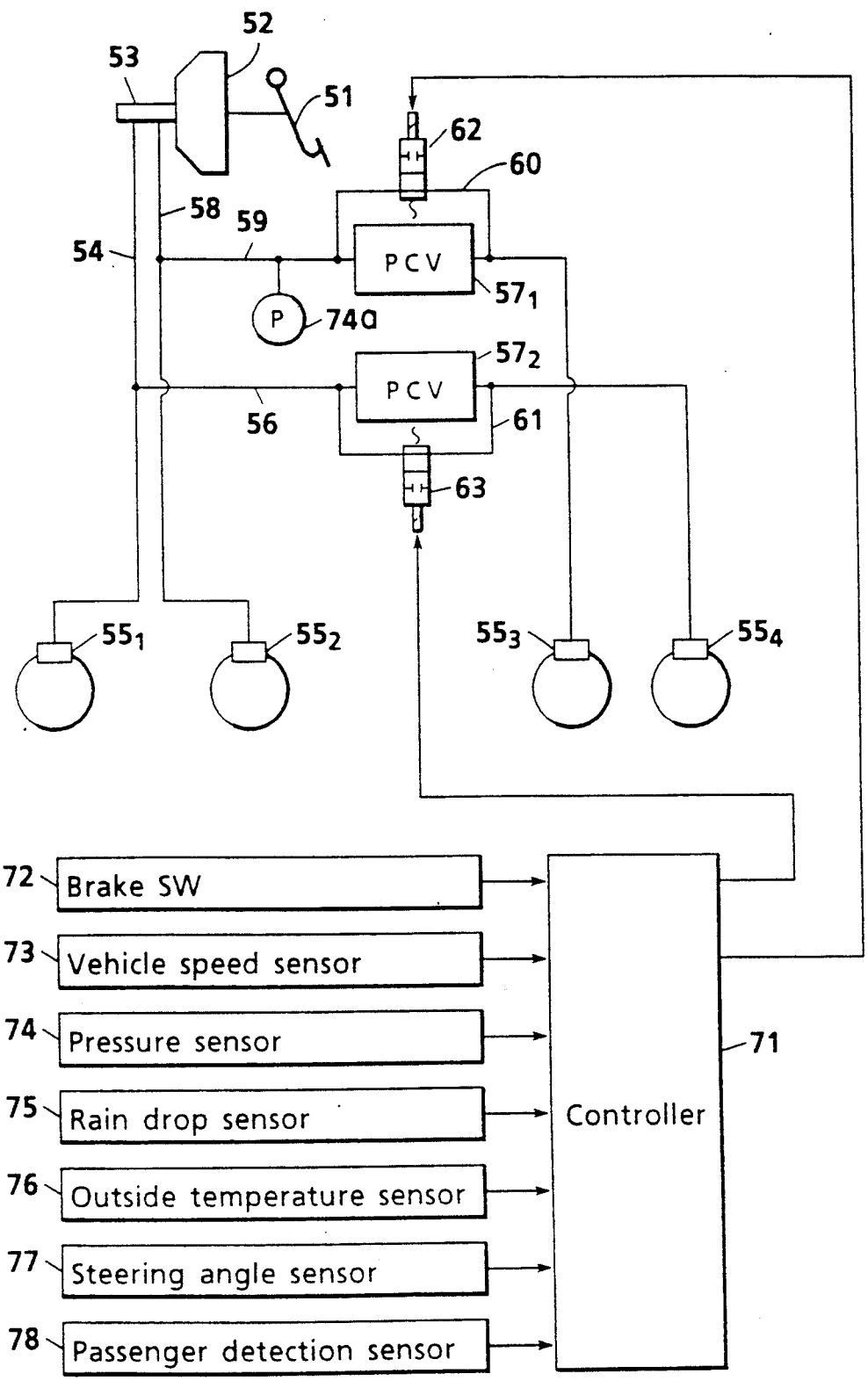
FIG. 1 is a block diagram showing a first embodiment of the rear wheel braking force control apparatus according to the present invention.
Figure 2:
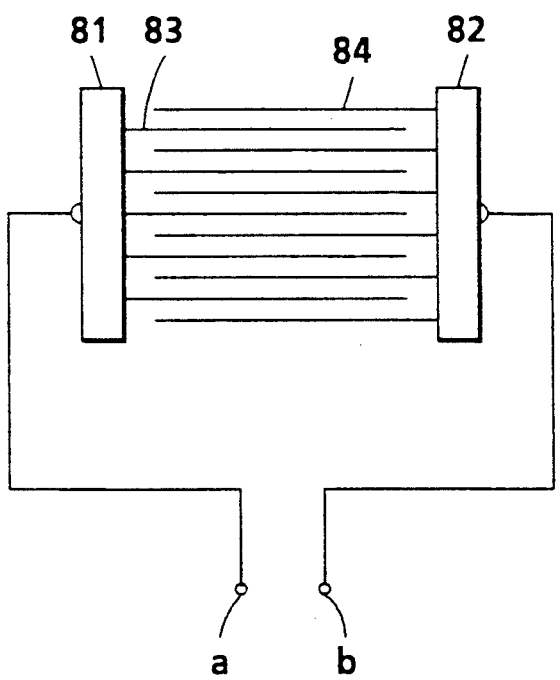
FIG. 2 is a schematic view of a rain drop sensor used in the first embodiment.
Figure 3:
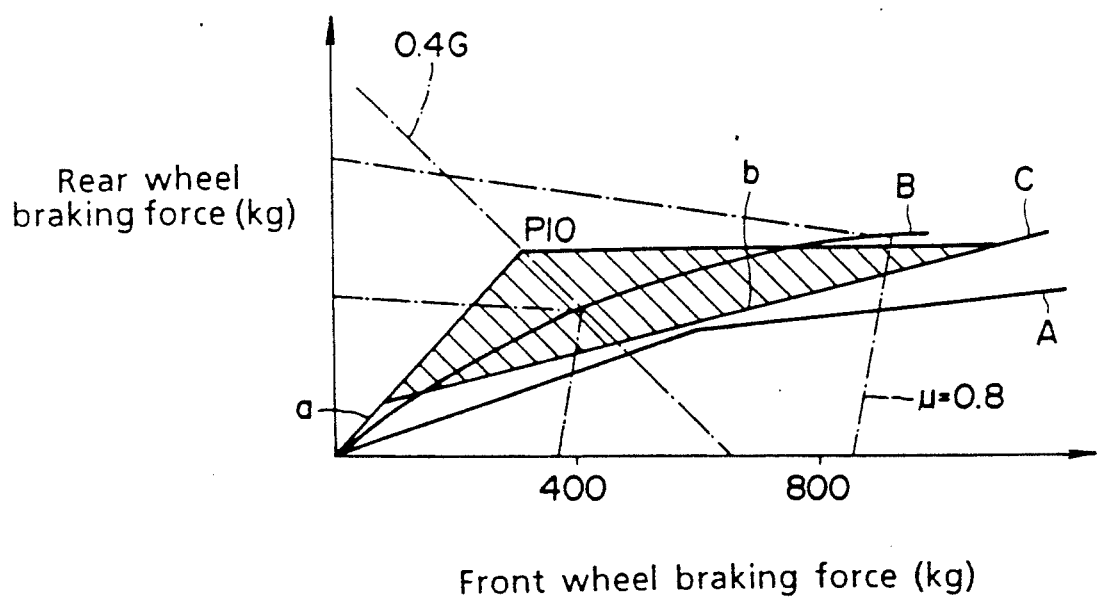
FIG. 3 is a diagram showing braking force allocation of front and rear wheels related to the first embodiment.
Figure 4:
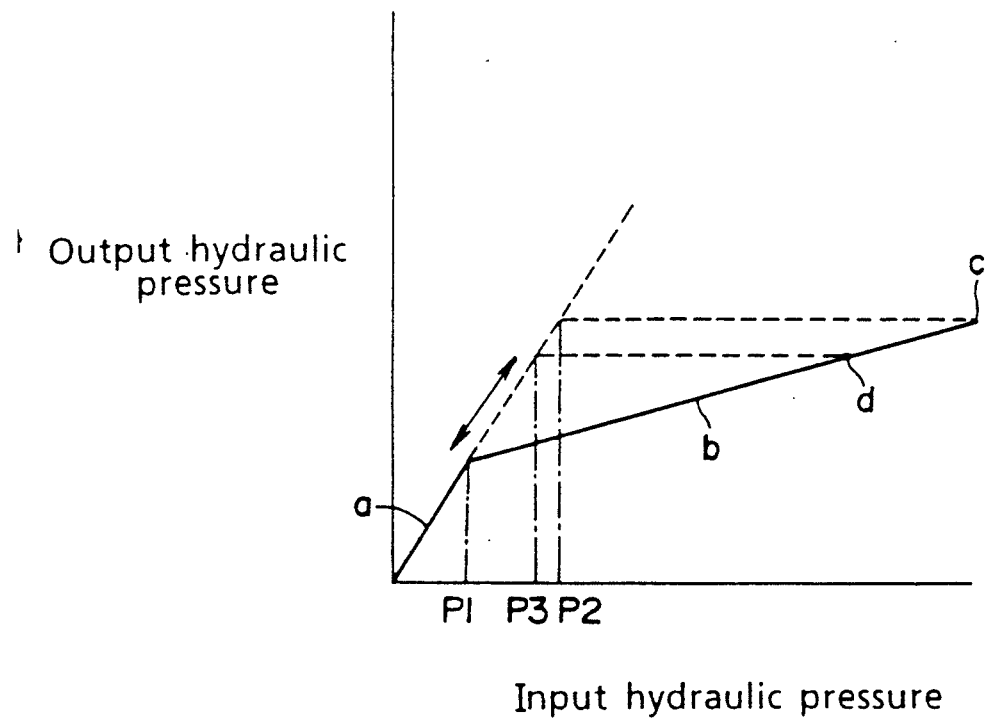
FIG. 4 is a diagram showing rear wheel braking force control area related to the first embodiment.
Figure 5:
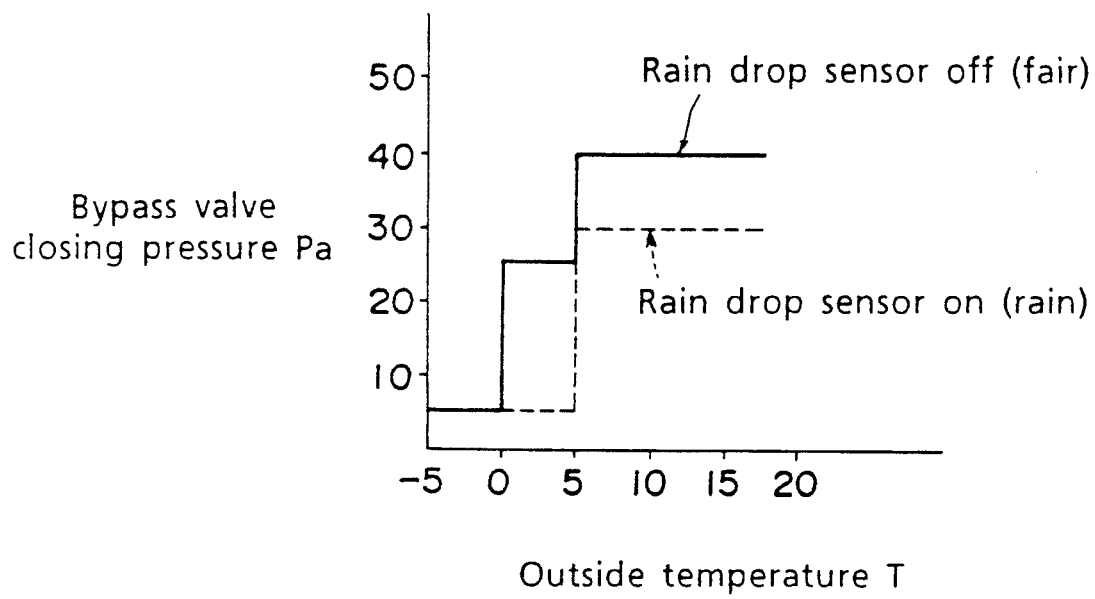
FIG. 5 is a diagram showing outside temperature correction related to the first embodiment.
Figure 6:
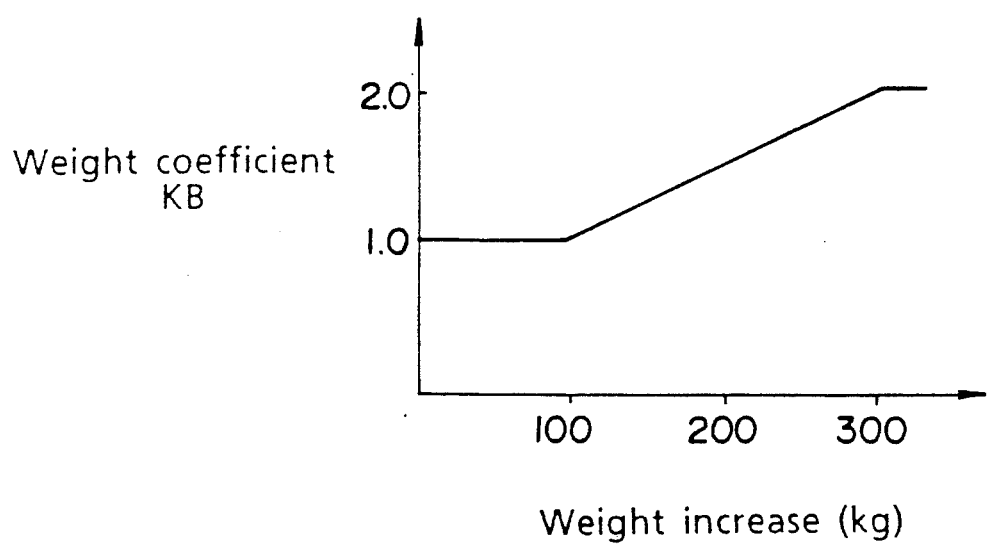
FIG. 6 is a diagram showing load correction related to the first embodiment.
Figure 7:
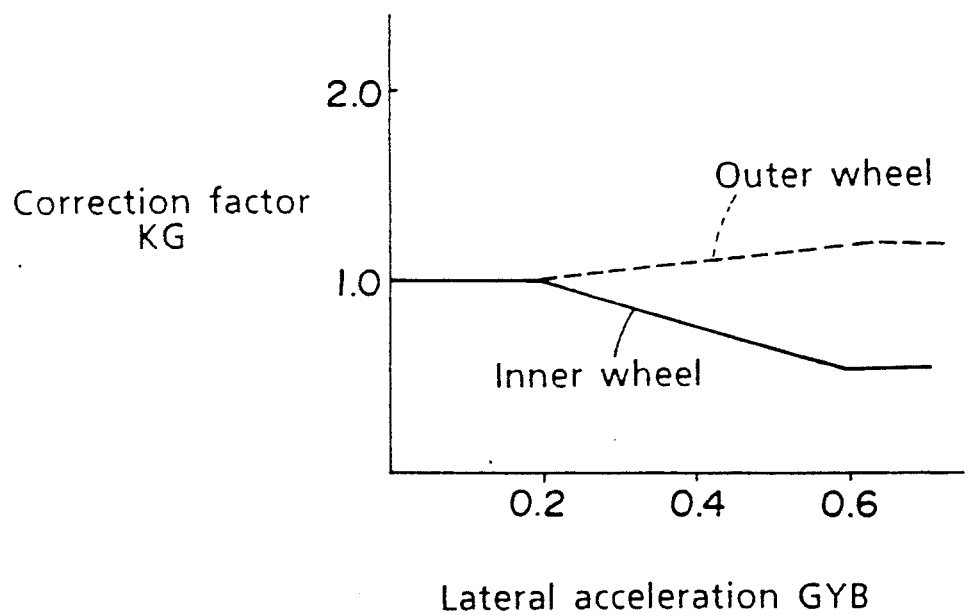
FIG. 7 is a diagram showing lateral acceleration correction related to the first embodiment.
Figure 8:
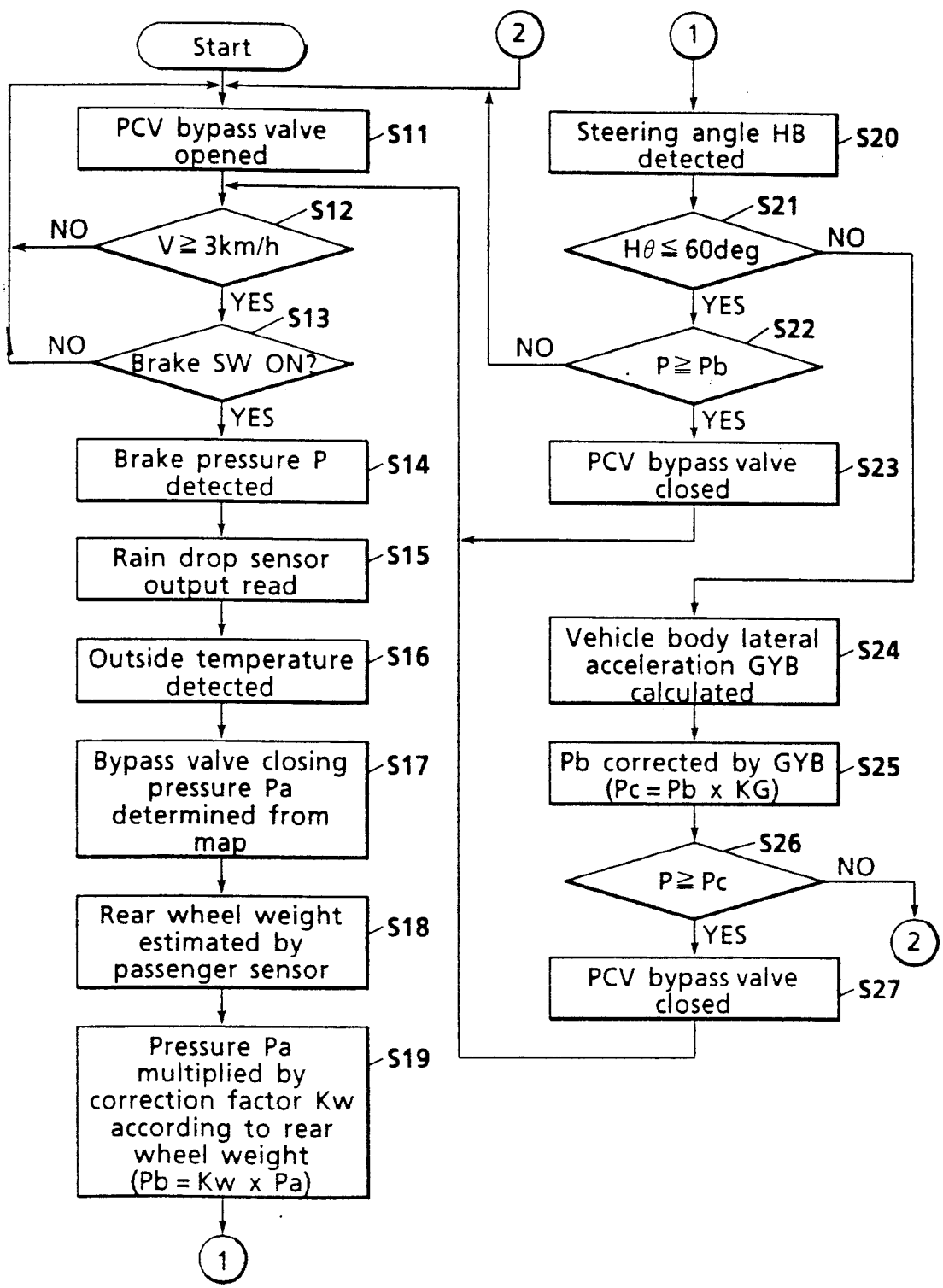
FIG. 8 is a flow chart for explaining operation of the first embodiment.

A first embodiment of the present invention will now be described with reference to the drawings. FIG. 1 is a block diagram showing the first embodiment of the rear wheel braking force control apparatus according to the present invention, FIG. 2 is a schematic view of a rain drop sensor, FIG. 3 is a diagram showing braking force allocation of front and rear wheels, FIG. 4 is a diagram showing rear wheel braking force control area, FIG. 5 is a diagram showing outside temperature correction, FIG. 6 is a diagram showing load correction, FIG. 7 is a diagram showing lateral acceleration correction, and FIG. 8 is a flow chart for explaining operation of the first embodiment.

In FIG. 1, numeral 51 indicates a brake pedal. Pressing force of the brake pedal is amplified through an assister 52, and then transmitted to a tandem master cylinder 53.

The master cylinder 53 is provided with two hydraulic pressure generators (not shown) which generate a brake hydraulic pressure according to the pressing amount of the brake pedal 51. One hydraulic pressure generator is connected to a wheel cylinder $55_1$ of the left front wheel through a pipe 54, and also to a wheel cylinder $55_4$ of the right rear wheel through a pipe 56 branched halfway from the pipe 54 and PCV$57_2$.

The other hydraulic pressure generator is connected to a wheel cylinder $55_2$ of the right front wheel through a pipe 58, and also to a wheel cylinder $55_3$ of the left rear wheel through a pipe 59 branched halfway from the pipe 58 and PCV$57_1$.

Figure 17:
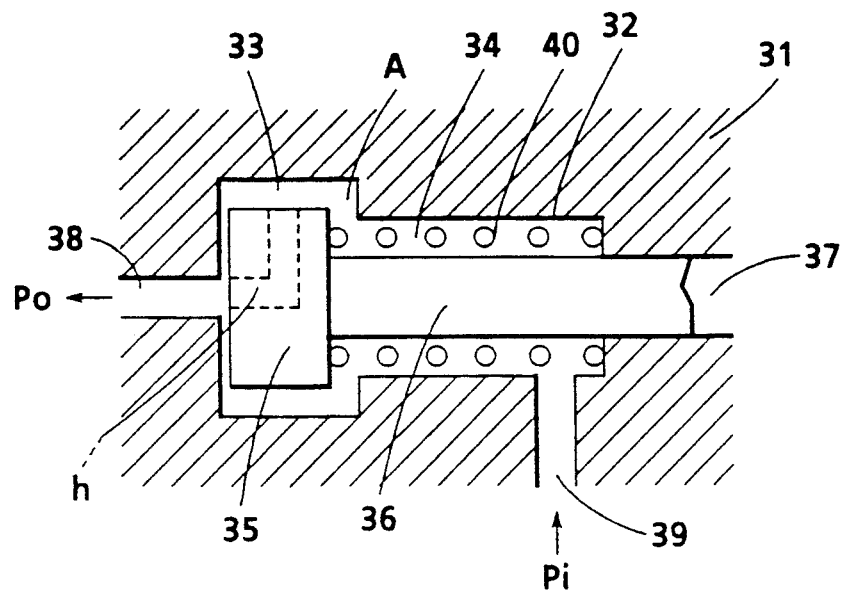
FIG. 17 is a schematic sectional view showing condition of a proportioning valve.
Figure 18:
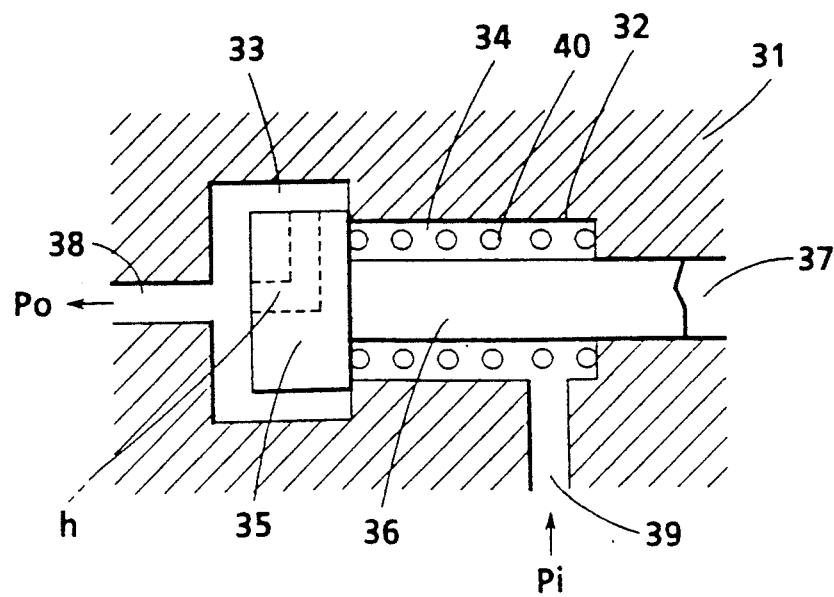
FIG. 18 is a schematic sectional view showing condition of a proportioning valve.
Figure 19:
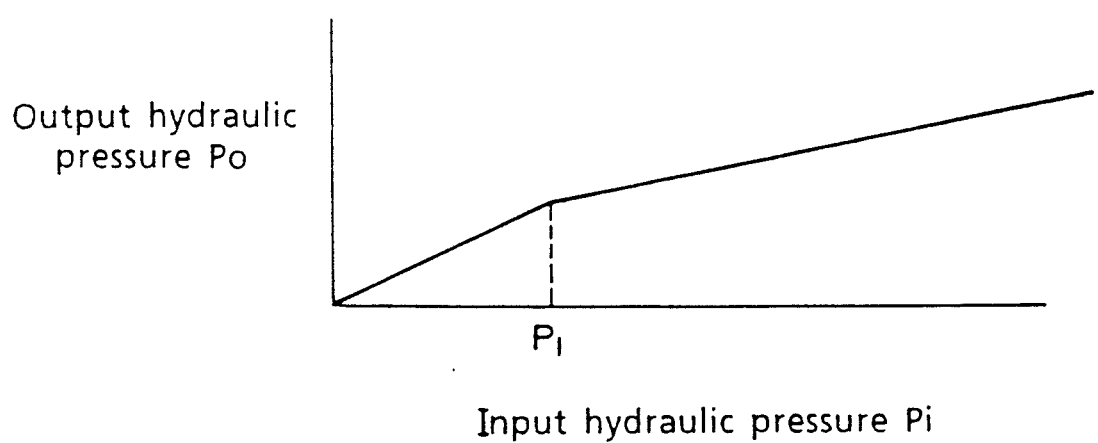
FIG. 19 is a diagram for explaining operation of a proportioning valve.

The PCV$57_1$ and $57_2$ are proportioning valves which function to transmit the master cylinder pressure, as is, to the wheel cylinders of the rear wheels when the braking force is small, and reduce an increasing rate of hydraulic pressure transmitted to the wheel cylinders of the rear wheels when the master cylinder pressure is at a setting pressure or more. The structure of the proportioning valves is the same as described with reference to FIGS. 17 to 19, and is not described here.

In the pipe 59, a bypass pipe 60 is provided between the upstream side and the downstream side of the PCV$_1$, and in the pipe 56, a pipe 61 is provided between the upstream side and the downstream side of the PCV$_2$. The bypass pipes 60 and 61 are individually provided with PCV bypass valves 62 and 63 which are electromagnetic valves of a normally-open type.

ON/OFF control of the PCV bypass valves 62 and 63 is made by a controller 71 as control means. The controller 71 comprises a microcomputer and its peripheral circuits.

The controller 71 is inputted with detection signals as input signals from a brake switch 72 which outputs an ON signal when the brake pedal 51 is pressed down, a vehicle speed sensor 73 for detecting a vehicle speed Vs, a pressure sensor 74 (in this embodiment disposed at one of 2-way pipes, but may alternatively be disposed at both pipes) for detecting a brake pressure P, that is, a hydraulic pressure outputted from the master cylinder 53, a rain drop sensor 75 for detecting raining condition, which outputs an OFF signal when it is fair and outputs an ON signal when it rains, an outside temperature sensor 76 for detecting an outside temperature, a steering angle sensor 77 for detecting a steering angle of the steering wheel, and passenger detection sensors 78 provided at individual seats for detecting the presence of passengers. The steering angle sensor 77 functions as turning condition detection means.

Detailed structure of the rain drop sensor 75 will be described with reference to FIG. 2. In FIG. 2, numerals 81 and 82 indicate electrodes disposed opposite to each other. Comb-formed conductor wires 83 extend from one electrode 81 towards the other electrode 82, and comb-formed conductor wires 84 extend from the other electrode 82 towards the one electrode 81 passing between adjacent conductor wires 83. A voltage is applied across the electrodes 81 and 82 to detect rainfall by detecting an electric current due to a short-circuit between terminals a and b by rain drops.

The controller 71 performs control as shown in the flow chart of FIG. 8 and has storage means for storing maps as shown in FIGS. 5 to 7. Thus, the controller 71 performs control to close the PCV bypass valves 62 and 63 when the pressure detected by the pressure sensor 74 is a setting pressure (Pb or Pc described later) thereby functioning the valve functions of the PCV$57_1$ and $57_2$.

Thus, in this embodiment, the normally-open PCV bypass valves 62 and 63 are disposed in the bypass pipes 60 and 61 for bypassing the PCV$57_1$ and $57_2$ provided in the brake system, the master cylinder pressure is transmitted, as is, to the wheel cylinders of the rear wheels until the brake pressure detected by the pressure sensor 74a reaches the setting pressure, and the PCV bypass valves 62 and 63 are closing controlled when the brake pressure detected by the pressure sensor 74 exceeds the setting pressure, thereby achieving the functions of the PCV$57_1$ and $57_2$.

The batched region in FIG. 3 indicates a basic region of rear wheel braking force controllable by the present apparatus, enabling generation of a braking force at the rear wheels which is higher than the braking force shown by an ideal braking force allocation curve B. A bent line C indicated by straight lines a and b indicate a braking force allocation with the PCV bypass valves 62 and 63 remained closed. Gradient of the portion of straight line a in the bent line C is sharper than the bent line A described in the prior art example. This is achieved by increasing the pressure-receiving areas (about 50:50) of the rear wheel cylinders $55_3$ and $55_4$ compared to those of the prior art, and characteristics at the bending point and after are achieved by setting the PCV$57_1$ and $57_2$.

FIG. 4 shows the bent line C portion of FIG. 3. The bent line C indicates input/output characteristics of the PCV$57_1$ and $57_2$, in which the output hydraulic pressure is determined by the straight line a until the input hydraulic pressure of the PCV$57_1$ and $57_2$ reaches P1 while the PCV bypass valves 62 and 63 are closed, and determined by the straight line b after the input hydraulic pressure of PCV$57_1$ and $57_2$ exceeds P1.

On the other hand, when the input hydraulic pressure is increased with the PCV bypass valves 62 and 63 opened, the output hydraulic pressure increases beyond P1 as shown by an extension (indicated by the broken line) of the straight line a and, when the input hydraulic pressure closes the PCV bypass valves 62 and 63 at P3, for example, the output hydraulic pressure is maintained until an intersecting point d of the straight line b by the function of the PCV$57_1$ and $57_2$, and when the input hydraulic pressure is increased even further from the point d, the output hydraulic pressure is determined by the straight line b.

The reason why the output hydraulic pressure is maintained is that an output hydraulic pressure Po is higher than that of normal control condition as indicated by the straight line b, as Po·So>Pi·Si+F, and a spacing A is closed.

Then, operation of the first embodiment of the present invention of the above arrangement will be described with reference to FIG. 8. First, the PCV bypass valves 62 and 63 are open controlled to invalidate the function of the PCV valves $57_1$ and $57_2$. To determine whether or not the vehicle substantially travels, determination is made as to whether or not the vehicle speed detected by the vehicle speed sensor 73 is 3 km/h or more. When it is determined to be 3 km/h or more, determination is made as to whether or not the brake switch 72 is ON (steps S11 to S13).

When it is determined in step S13 to be YES, the brake pressure detected by the pressure sensor 74, the output of the rain drop sensor 75, and the outside temperature T detected by the outside temperature sensor 76 are read by the controller 71 (steps S14 to S16).

Referring to a map in FIG. 5, a bypass valve closing pressure Pa at which the PCV bypass valves 62 and 63 are closed is determined according to the outside temperature T. In FIG. 5, a map indicated by the solid line is referred to when the output of the rain drop sensor 75 is OFF (fair), and a map indicated by the broken line is referred to when the output of the rain drop sensor 75 is ON (rain). Since the road surface is less slippery when it is fair, the closing pressure Pa is set greater. Since the road surface is slippery when the outside temperature T is low, the closing pressure Pa is set smaller. Thus, when it rains, the closing pressure Pa is switched in two steps past an outside temperature of 5° C. The lower the closing pressure Pa, the more slippery the road surface (lower locking limit). A maximum value 40 kg/cm² of the closing pressure Pa is set according to the brake pressure at point P10 in FIG. 3.

Then, a weight increase by passengers detected by the passenger detection sensor 78 is estimated, and a weight factor KB is determined with reference to a map of FIG. 6 (step S18). The weight increase is determined as follows. A piezoelectric element is disposed at each seat, and the presence of a passenger is determined from a detection signal from the element. When a passenger sits on the front seat, what % of the passenger's weight is loaded on the rear wheels is calculated, and when a passenger sits on the rear seat, what % of the passenger's weight is loaded on the rear wheels is calculated. Thus, the weight increase on the rear wheels is calculated. As can be seen from the map of FIG. 6, the weight factor KB increases with increasing weight increase. This is because the more the rear wheel load increases, the less locking of rear wheels tends to generate.

Then, the closing pressure Pa determined in step S17 is multiplied by KB determined with reference to the map of FIG. 6 to determine the closing pressure Pb corrected by the rear wheel load (step S19). Therefore, the closing pressure Pb increases with increasing rear wheel load and decreasing locking tendency (higher locking limit).

Then, the steering angle Hθ detected by the steering angle sensor 77 is read by the controller 71, and determination is made as to whether or not the steering angle Hθ is 60 degrees or less (steps S20 and S21). When the steering angle Hθ is 60 degrees or less, determination is made as to whether or not the brake pressure P detected by the pressure sensor 74 is not less than the closing pressure Pb (step S22), when it is less than Pb, the procedure after step S11 is repeated, or when it is not less than Pb, the PCV bypass valves 62 and 63 are closing controlled (step S23).

On the other hand, when the determination result is NO in step S21, that is, when it is determined that the steering angle Hθ is greater than 60 degrees, a lateral acceleration GYB applied to the vehicle body is calculated from the vehicle speed V detected by the vehicle speed sensor 73 and the steering angle Hθ detected by the steering angle sensor 77 (step S24).

A correction factor KG corresponding to the calculated lateral acceleration GYB is determined with reference to a map shown in FIG. 7. The correction factor KG is the same for the outer wheel side and the inner wheel side up to a lateral acceleration GYB of 0.2 g, the outer wheel side increases and the inner wheel side decreases for the lateral acceleration GYB from 0.2 g to 0.6 g, and a correction factor KG for 0.6 g is maintained for a lateral acceleration GYB of 0.6 g or more. This is because, since the sharper the turning degree, the more weight is shifted to the outer wheel side, the less the outer wheels tend to lock than the inner wheels (step S25).

Then, the closing pressure Pb calculated in step S19 is multiplied by the correction factor KG to calculate a closing pressure Pc. Thus, the sharper the turning degree, the higher the closing pressure of the outer wheel where the locking limit is high, and the lower the closing pressure of the inner wheel where the locking limit is low.

When the brake pressure detected by the pressure sensor 74 is the inner wheel closing pressure, the inner wheel side of the PCV bypass valves 62 and 63 is closed, and after that, when the brake pressure is the outer wheel closing pressure, the outer wheel side of the PCV bypass valves 62 and 63 is closed (steps S26 and S27). That is, an increase in brake pressure at the inner wheel side which tends to lock during turning is suppressed by closing the PCV bypass valve at the inner wheel side earlier than the PCV bypass valve at the outer wheel side during turning.

Figure 9:
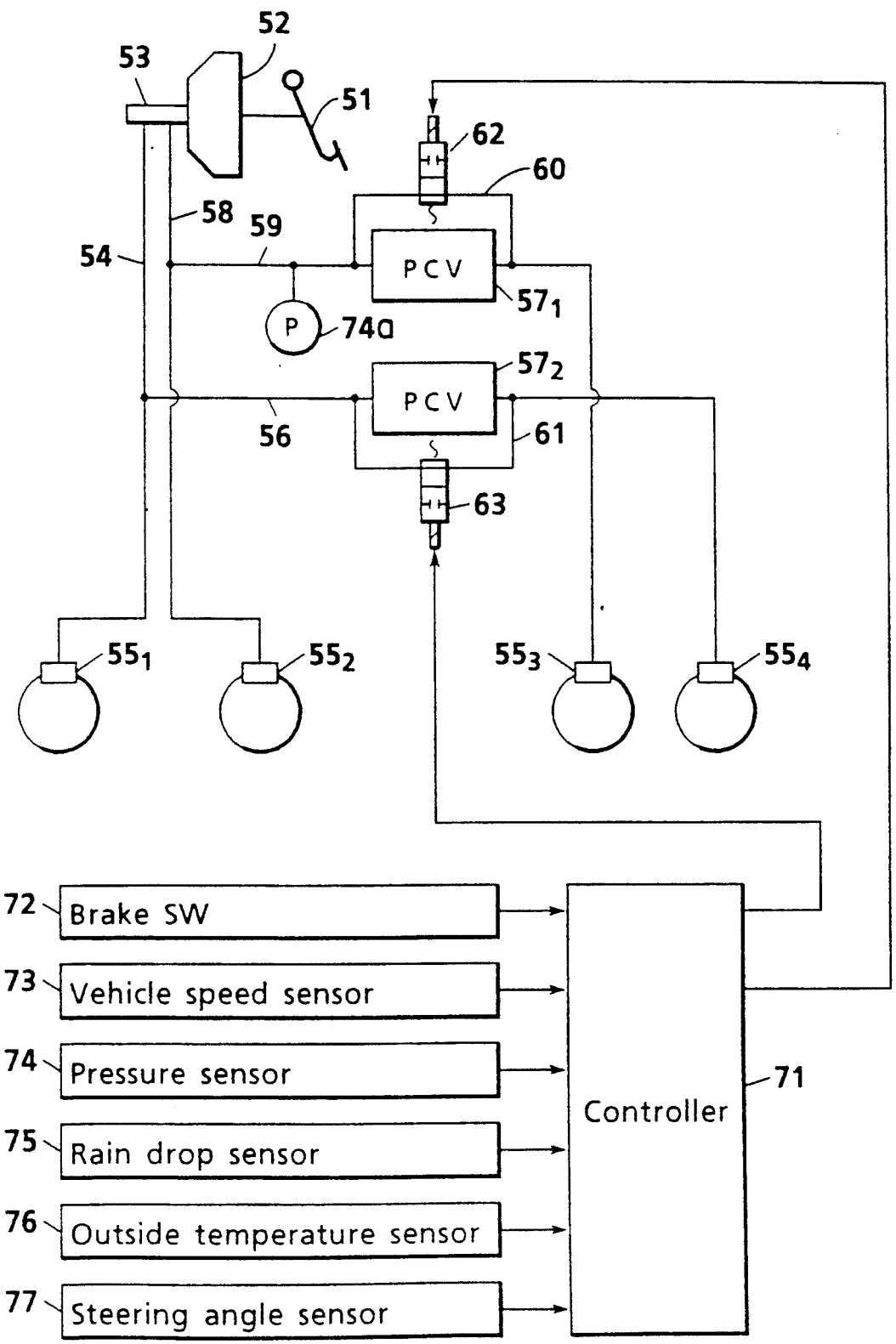
FIG. 9 is a block diagram showing a second embodiment of the rear wheel braking force control apparatus according to the present invention.
Figure 10:
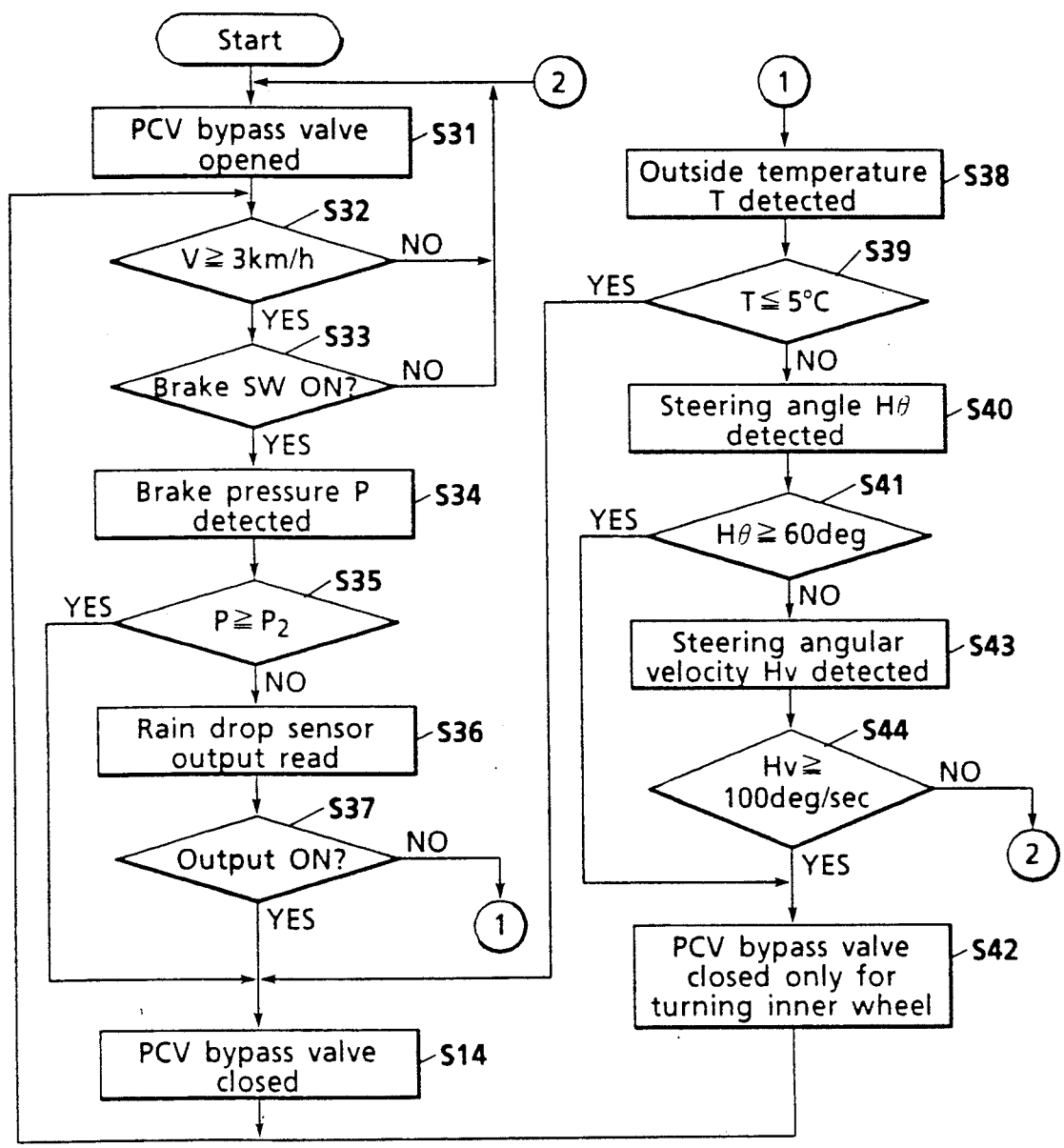
FIG. 10 is a flow chart for explaining operation of the second embodiment.
Figure 11:
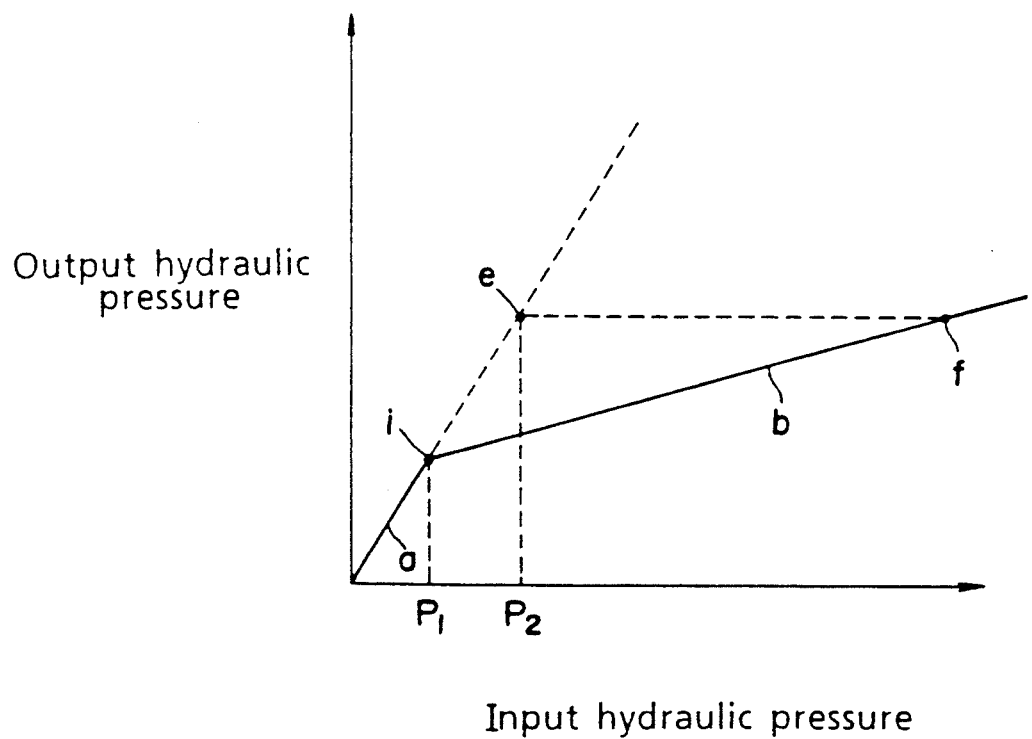
FIG. 11 is a diagram for explaining operation of PCV related to the second embodiment.

A second embodiment of the present invention will now be described with reference to FIGS. 9 to 11. FIG. 9 is a block diagram showing the second embodiment of the rear wheel braking force control apparatus according to the present invention, FIG. 10 is a flow chart for explaining operation of the second embodiment, and FIG. 11 is a diagram for explaining operation of PCV.

In FIG. 9, the same numerals refer to the same elements as used in FIG. 1 and are not described in detail. In the first embodiment, the closing pressure of the PCV bypass valves 62 and 63 is first determined from the outside temperature T to correct the closing pressure according to the rear wheel load and the turning condition. However, in the second embodiment, the closing pressure is predetermined as a setting pressure P2 (pressure corresponding to point P10 in FIG. 3), when the brake pressure P is not more than the setting pressure P and the rear wheels tend to lock, for example, when it rains, the PCV bypass valves 62 and 63 are closed even if the brake pressure P is lower than the setting pressure P to achieve the function of the PCV$57_1$ and $57_2$. Thus, in the second embodiment, the setting pressure to close the PCV bypass valves 62 and 63 is substantially decreased to zero.

Operation of the second embodiment will be described with reference to FIG. 10. Firstly, the PCV bypass valves 62 and 63 are opened to invalidate the function of the PCV valves $57_1$ and $57_2$. To determine whether or not the vehicle is substantially traveling, determination is made as to whether or not the vehicle speed detected by the vehicle speed sensor 73 is not less than 3 km/h. When it is determined to be 3 km/h or more, determination is made as to whether or not the brake switch 72 is ON (steps S31 to S33).

When it is determined to be YES in step S33, the brake pressure P detected by the pressure sensor 74 is read, and determination is made as to whether or not the pressure P is not less than a setting pressure P2 (for example, 40 kg/cm$^2$) (steps S34 and S35). When it is determined to be YES in step S35, the PCV bypass valves 62 and 63 are closed (step S36). This operates the function of the PCV $57_1$ and $57_2$. Thus, when the input hydraulic pressure is P2 or more, the output hydraulic pressure is maintained at point e in FIG. 11, and after that, when the input hydraulic pressure is a value at point f or more, the output hydraulic pressure increases as indicated by the straight line b.

When it is determine to be NO in step S35, that is, when it is determined that the brake pressure P is smaller than P2, the output of the rain drop sensor 75 is read by the controller 71, and determination is made as to whether or not the output is ON (step S37). When the output of the rain drop sensor 75 is ON, since the road surface is slippery due to rain and the rear wheels tend to lock, the PCV bypass valves 62 and 63 are closed to operate the function of the PCV $57_1$ and $57_2$ (step S36). Thus, in this case, the PCV bypass valves 62 and 63 are closed to function the PCV $57_1$ and $57_2$ from the beginning of braking, and when the input hydraulic pressure is at point i in FIG. 11, the increase in ouput hydraulic pressure becomes moderate as shown by the straight line b.

When it is determined to be NO in step S37, the outside temperature T detected by the outside temperature sensor 76 is read by the controller 71, and determination is made as to whether or not the outside temperature T is not higher than 5° C. (steps S38 and S39).

When it is determined that the outside temperature T is 5° C. or less, since the road surface is slippery and the rear wheels tend to lock, the PCV bypass valves 62 and 63 are closed to operate the function of the PCV$57_1$ and $57_2$ (step S36). Thus, in this case, the PCV bypass valves 62 and 63 are closed to function the PCV$57_1$ and $57_2$ from the beginning of braking, the output hydraulic pressure is maintained at point h even if the input hydraulic pressure is increased, and after that, when the input hydraulic pressure is a value of point i in FIG. 11 or more, the increase in output hydraulic pressure is moderated as shown by the straight line b.

On the other hand, when it is determined to be NO in step S39, the steering angle Hθ detected by the steering angle sensor 77 is detected, when the steering angle Hθ is not less than 60 degrees, it is determined that the vehicle is turning, and only the turning inner side one of the PCV bypass valves 62 and 63 is closed (steps S40 to S42).

On the other hand, when it is determined to be NO in step S41, a steering wheel angular velocity Hv is detected, determination is made as to whether or not the steering wheel angular velocity Hv is not less than 100 deg/sec, and the only the turning inner side one of the PCV bypass valves 62 and 63 is closed (steps S43, S44, and S42).

As described above, when the steering angle Hθ is not less than 60 degrees or when the steering wheel angular velocity Hv is not less than 100 deg/sec, it is determined that the vehicle is turning, and the rear wheel braking force of the outer rear wheel side is controlled to be greater than the rear wheel braking force of the inner wheel side by closing the PCV bypass valve of the outer wheel side where a load shift takes place later than the PCV bypass valve of the inner wheel side. Therefore, braking stability of the vehicle can be improved even if braking is made during turning.

Figure 12:
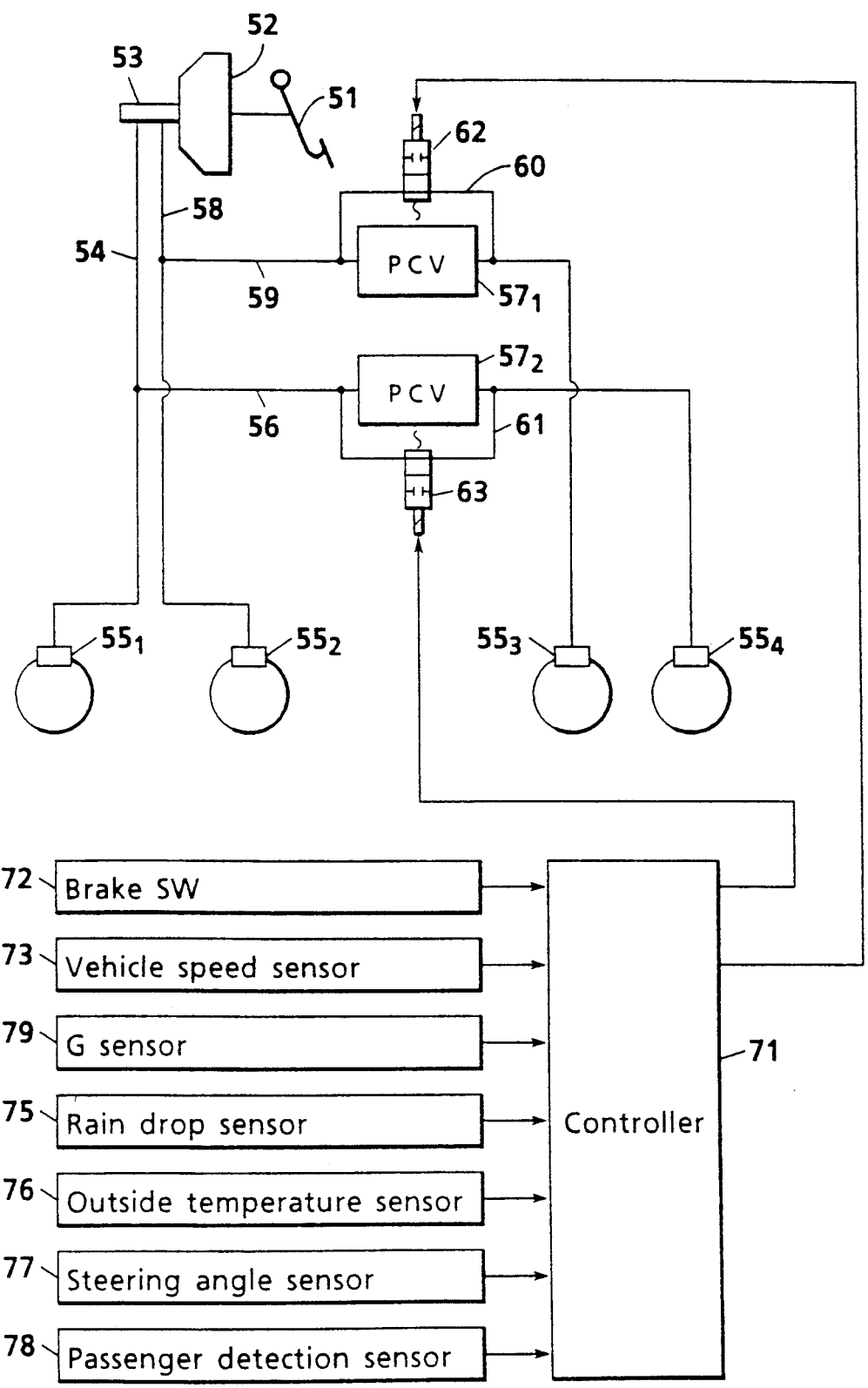
FIG. 12 is a block diagram showing a third embodiment of the rear wheel braking force control apparatus according to the present invention.
Figure 13:
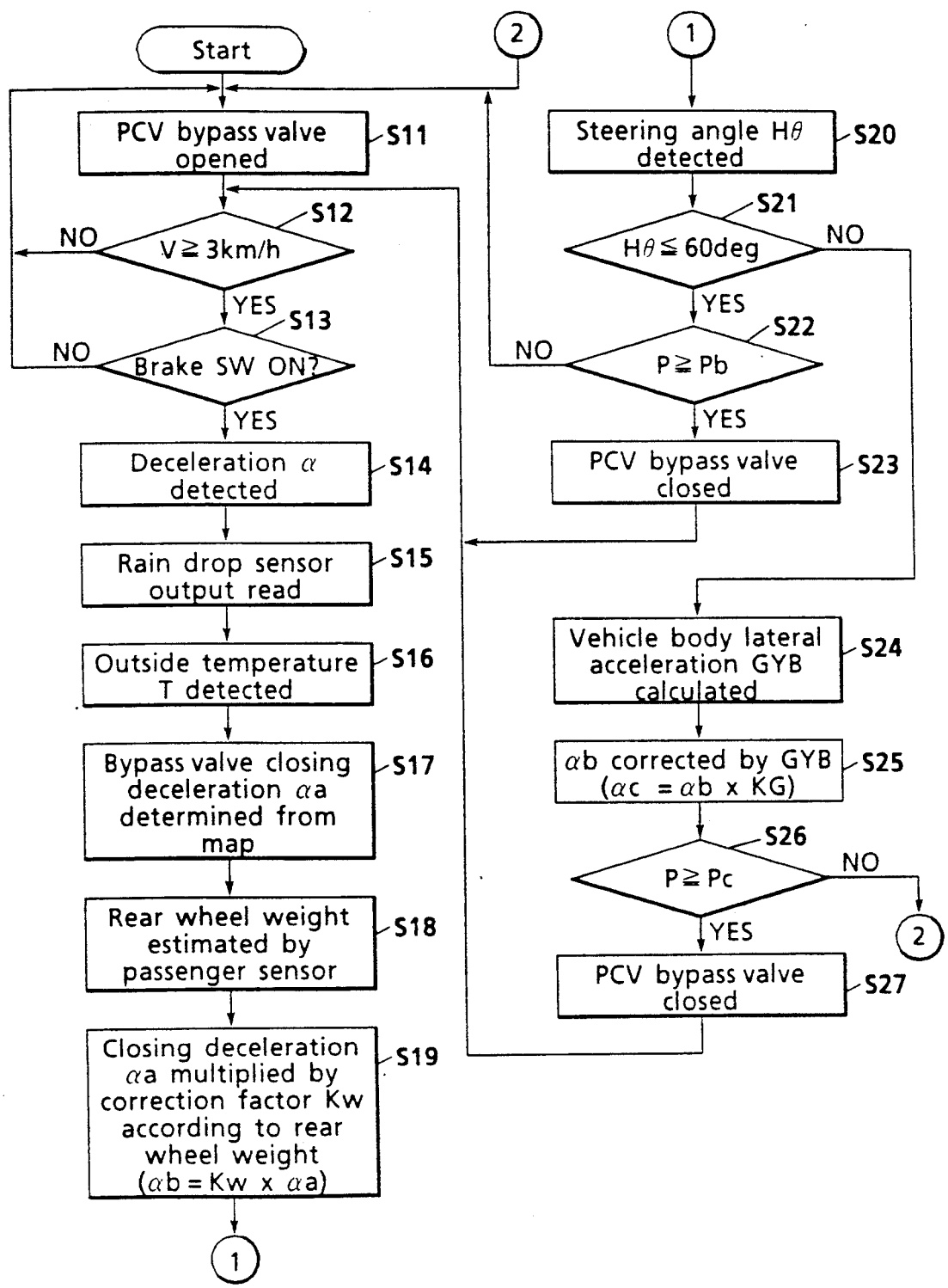
FIG. 13 is a flow chart for explaining operation of the second embodiment.

FIG. 12 shows a third embodiment of the present invention, which uses a G sensor 79 as braking degree detection means in place of the pressure sensor 74 used in the first embodiment. The G sensor 79 detects a deceleration of the vehicle body, and the processing shown in FIG. 13 is executed in the controller 71. This processing applies a vehicle body deceleration α detected by G sensor 79 and closing decelerations αa, αb, and αc set by the controller 71 in place of the brake pressure P and the closing pressures Pa, Pb, and Pc used in the first embodiment, the processing is substantially the same as in the first embodiment and its detailed description is omitted.

In the third embodiment, when the vehicle body deceleration α reaches a predetermined value αb, the PCV bypass valves 62 and 63 are closed so that the vehicle body deceleration at which the proportioning valve begins to function differs between the inner wheel side and the outer wheel side, thereby obtaining the same effect as in the first embodiment.

The use of the vehicle body deceleration shown in the third embodiment can also be applied to the second embodiment using the same procedure as described above.

Figure 14:
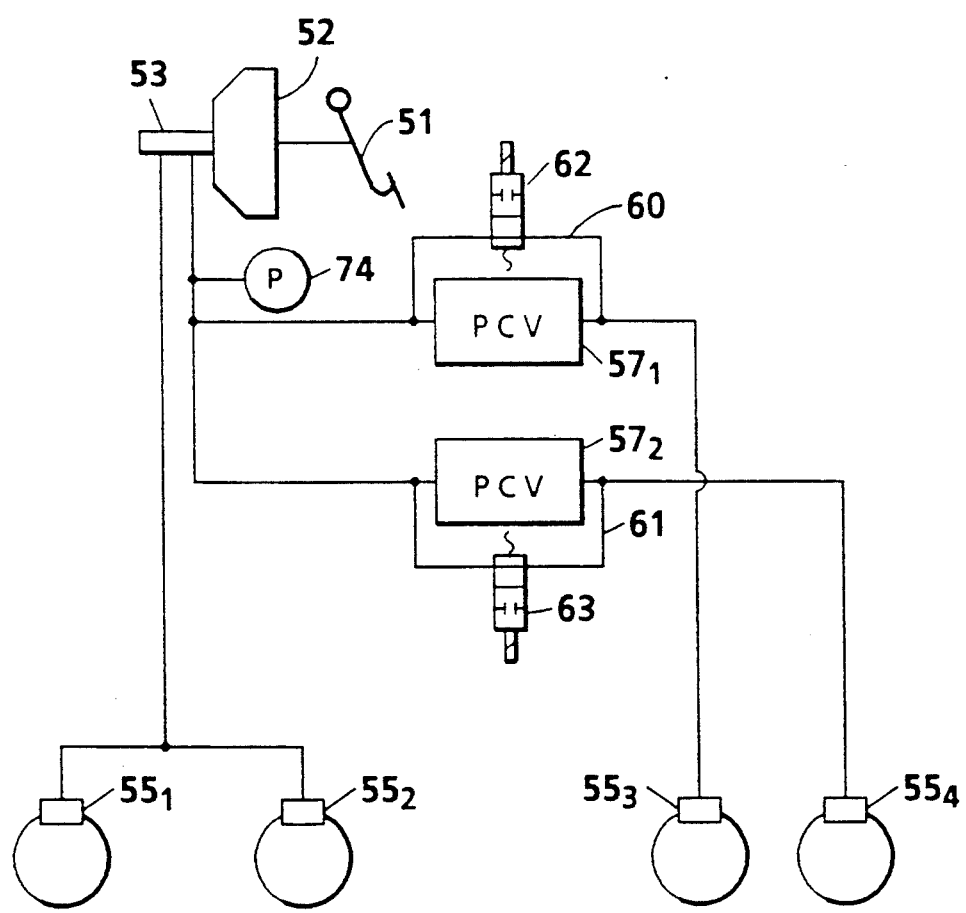
FIG. 14 is a piping diagram showing another embodiment.
Figure 15:
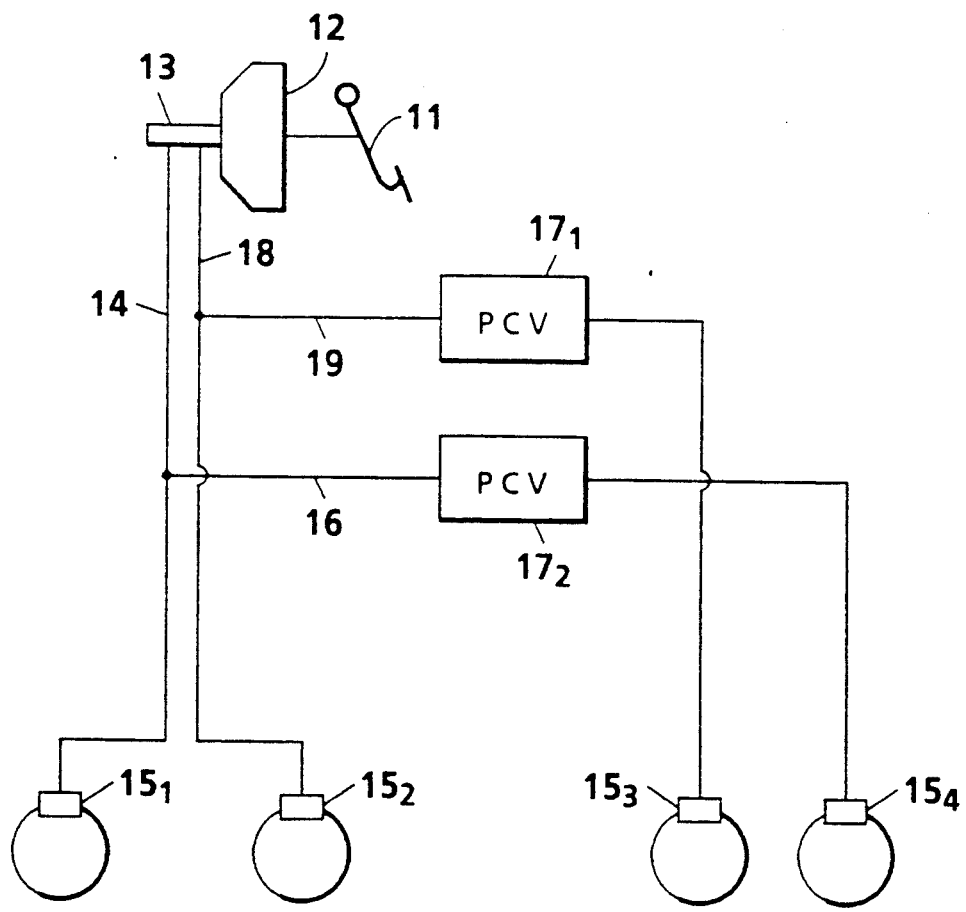
FIG. 15 is a schematic view showing a prior art braking apparatus.
Figure 16:
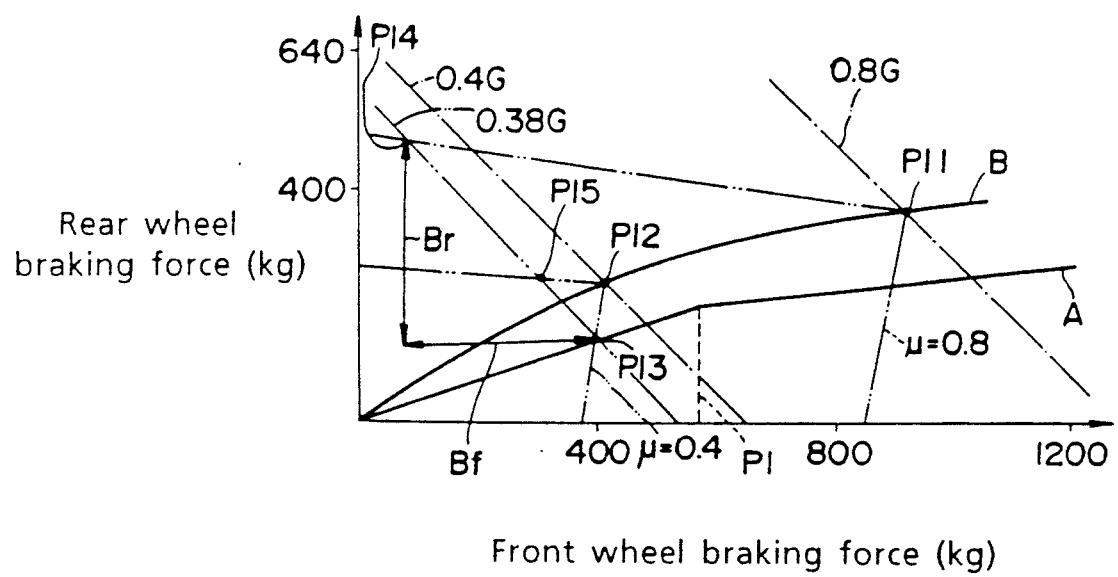
FIG. 16 is a diagram showing hydraulic pressure allocation of a prior art braking apparatus.

The present invention is not limited to the above-described embodiments, but may be applied to front and rear piping arrangement used in common FR vehicles using a valve arrangement as shown in FIG. 14, or may use PCV bypass valves of a normally-close type. Furthermore, a proportioning valve of another type or with other characteristics may be used, and a lateral acceleration sensor or means for detecting vehicle body rolling may be used as the turning condition detection means. Needless to say that various other modifications within the scope of the present invention are possible.

We claim:

1. In a rear wheel braking force control apparatus of a vehicle comprising proportioning valves (57$_1$, 57$_2$) disposed in passages (56, 59) for supplying a hydraulic pressure generated by a master cylinder (53) to wheel cylinders (55$_3$, 55$_4$) of right and left rear wheels for controlling wheel cylinder pressure so that increasing rate of the wheel cylinder pressure is smaller than increasing rate of master cylinder pressure;

electromagnetic valves (62, 63) disposed in the passage to effect or invalidate the action of said proportioning valves;

said electromagnetic valves being ON/OFF valves disposed in passages (60, 61) for bypassing said proportioning valves and transmitting the master cylinder pressure to said wheel cylinders; and control means (71) for controlling operation of said electromagnetic valves;

said apparatus further comprises:

braking degree detection means for detecting degree of braking during braking of the vehicle; and turning condition detection means for detecting turning condition of the vehicle;

said proportioning valves and said electromagnetic valves being provided for the individual right and left rear wheels;

said control means operating said electromagnetic valves to invalidate the action of said proportioning valves when the braking degree detected by said braking degree detection means is weaker than a setting degree, and effect the action of said proportioning valves when the braking degree is stronger than the setting degree; and during turning of the vehicle, the setting degree being corrected so that the setting degree of said electromagnetic valve at the outer wheel side of turning is relatively higher than the setting degree of said electromagnetic valve at the inner wheel side of turning.

2. The apparatus of claim 1 wherein said turning condition detection means detects a steering angle of a steering wheel; and when the steering angle is a predetermined value or more, said control means corrects the setting degree so that the setting degree of said electromagnetic valve at the outer wheel side of turning is relatively higher than the setting degree of said electromagnetic valve at the inner wheel side of turning.

3. The apparatus of claim 1 further comprising:

lateral acceleration detection means (73, 77, 71) for detecting lateral acceleration applied to the vehicle body; and when the lateral acceleration is a predetermined value or more, said control means corrects the setting degree so that the setting degree of said electromagnetic valve at the outer wheel side of turning is relatively higher than the setting degree of said electromagnetic valve at the inner wheel side of turning.

4. The apparatus of claim 3 wherein said control means increases the setting degree of said electromagnetic valve at the outer wheel side of turning according to the lateral acceleration.

5. The apparatus of claim 3 wherein said control means decreases the setting degree of said electromagnetic valve at the inner wheel side of turning according to the lateral acceleration.

6. The apparatus of claim 3 wherein said lateral acceleration detection means comprises vehicle speed detection means (73) for detecting a vehicle speed, steering angle detection means (77) for detecting a steering angle of the steering wheel, and calculation means (71) for determining the lateral acceleration (GYB) by calculation according the vehicle speed and the steering angle.

7. The apparatus of claim 1 wherein said turning condition detection means detects a steering wheel angular velocity of a steering wheel; and when the steering wheel angular velocity is a predetermined value or more, said control means corrects the setting degree so that the setting degree of said electromagnetic valve at the outer wheel side of turning is relatively higher than the setting degree of said electromagnetic valve at the inner wheel side of turning.

8. The apparatus of claim 1 wherein said control means corrects the setting degree only of said electromagnetic valve at the inner wheel side of turning to a lower value during turning of the vehicle.

9. The apparatus of claim 8 wherein said control means corrects the setting degree of said electromagnetic valve at the inner wheel side of turning to zero during turning of the vehicle.

10. The apparatus of claim 9 further comprising:

braking operation detection means (72) for detecting operation of a brake pedal, and said control means execute the control only when the brake pedal is operated.

11. The apparatus of claim 1 further comprising:

braking condition detection means (75, 76, 77, 78) for detecting braking condition of the vehicle affecting height of a locking limit of the rear wheels; and said control means sets the setting degree according to the braking condition, and corrects the setting degree during turning of the vehicle.

12. The apparatus of claim 11 wherein said braking condition detection means has rain detection means (75) for detecting the presence of rain, and said control means sets the setting degree to a lower value when it rains.

13. The apparatus of claim 11 wherein said braking condition detection means has outside temperature detection means (76) for detecting outside temperature, and said control means corrects the setting degree to a lower value when the outside temperature is low.

14. The apparatus of claim 11 wherein said braking condition detection means has rear wheel load detection means (78) for detecting load of the rear wheels, and said control means corrects the setting degree to a higher value when the rear wheel load is high.

15. The apparatus of claim 1 wherein said braking degree detection means (74) detects the master cylinder pressure, and said control means uses a setting pressure as the setting degree and controls said electromagnetic valves by comparing the detected master cylinder pressure with the setting pressure.

16. The apparatus of claim 13 wherein said braking degree detection means detects a hydraulic pressure in a passage between said master cylinder and said proportioning valve.

17. The apparatus of claim 1 wherein said braking degree detection means detects a deceleration generated on the vehicle body, said control means uses a setting deceleration as the setting degree and controls said electromagnetic valves by comparing the detected deceleration with the setting deceleration.

18. The apparatus of claim 1 wherein said electromagnetic valves are ON/OFF valves disposed in passages (60, 61) for bypassing said proportioning valves and transmitting the master cylinder pressure to said wheel cylinders.

19. In a rear wheel braking force control method for a vehicle comprising controlling operation of electromagnetic valves disposed in passages (56, 59) for supplying a hydraulic pressure generated by a master cylinder (53) to wheel cylinders (553, 554) of right and left rear wheels to effect or invalidate operation of proportioning valves (571, 572) for controlling wheel cylinder pressure so that increasing rate of wheel cylinder pressure is smaller than increasing rate of master cylinder pressure, said electromagnetic valves being ON/OFF valves disposed in passages (60, 62) for bypassing said proportioning valves and transmitting the master cylinder pressure to said wheel cylinders;

said method further comprises:
a braking degree detection step (S14) for detecting a braking degree during braking of the vehicle;
a turning condition detection means (S20, S24) for detecting turning condition of the vehicle;
an invalidation step (S22, S26, S11) for operating said electromagnetic valves to invalidate operation of said proportioning valves when the braking degree detected in said braking degree detection step is weaker than a setting degree;
an effecting step (S22, S26, S23, S27) for operating said electromagnetic valves to effect operation of said proportioning valves when the braking degree is stronger than the setting degree; and
a turning correction step (S25) for correcting the setting degree of said electromagnetic valve at the outer wheel side of turning to a relatively higher value than the setting value of said electromagnetic valve at the inner wheel side of turning according to detection result of said turning condition detection step during turning of the vehicle.

20. The method of claim 19 further comprising:
a braking condition detection step (S15, S16, S18) for detecting braking condition of the vehicle affecting height of a locking limit of the rear wheels; and
a reference degree setting step (S17, S19) for setting a higher setting degree as the locking limit increases according to the braking condition detected in the braking condition detection step; and wherein
said turning correction step corrects the setting degree set in said reference degree setting step.

* * * * *